US007817671B2

(12) United States Patent
Isaksson (10) Patent No.: US 7,817,671 B2
(45) Date of Patent: Oct. 19, 2010

(54) METHOD IN A TRANSCEIVER FOR ALLOCATING TRANSMISSION CAPACITY BETWEEN THE TWO DIRECTIONS OF TRANSMISSION IN WIRE LINE DATA COMMUNICATION (75) Inventor: Mikael Isaksson, Lulea (SE)

(73) Assignee: Ericsson AB, Kista (SE)

( * ) Notice: Subject to any disclaimer, the term of this patent is extended or adjusted under 35 U.S.C. 154(b) by 644 days.

(21) Appl. No.: 10/551,769

(22) PCT Filed: Apr. 2, 2004

(86) PCT No.: PCT/SE2004/000525

§ 371 (c)(1),
(2), (4) Date: Jul. 17, 2006

(87) PCT Pub. No.: WO2004/091249

PCT Pub. Date: Oct. 21, 2004

(65) Prior Publication Data

US 2007/0008881 A1    Jan. 11, 2007

Related U.S. Application Data

(60) Provisional application No. 60/461,407, filed on Apr. 10, 2003.

(30) Foreign Application Priority Data

Apr. 10, 2003   (SE)   .................... 0301063

(51) Int. Cl.
*H04J 3/16* (2006.01)
*H04J 3/00* (2006.01)
*H04J 1/00* (2006.01)

(52) U.S. Cl. .................. 370/480; 370/464; 370/468

(58) Field of Classification Search .................. 370/343, 370/344, 468, 487, 490, 276–293, 480, 464
See application file for complete search history.

(56) References Cited

U.S. PATENT DOCUMENTS 6,333,920 B1   12/2001   Nguyen et al.
6,373,860 B1    4/2002   O'Toole et al.

FOREIGN PATENT DOCUMENTS

| DE | 19851 310 A1 | 5/2000 |
|---|---|---|
| EP | 0991202 | 4/2000 |
| EP | 1 028 558 A1 | 8/2000 |
| WO | WO 9943123 | 8/1999 |

OTHER PUBLICATIONS

Madan, "How DSL Works", Mar. 1, 2001, PCQuest, all pages.*
Bengtsson, "Zipper Performance when mixing ADSL and VDSL in terms of reach and capacity", May 12-16, 1997, Telia Research AB, all pages.*

(Continued)

*Primary Examiner*—Kwang B Yao
*Assistant Examiner*—Adam Duda
(74) *Attorney, Agent, or Firm*—Young & Thompson (57) ABSTRACT

A method performed in one single transceiver for allocating transmission capacity between the two directions of transmission in wire line data communication. The method includes the step of allocating from the single transceiver different parts of the available bandwidth to different duplex methods simultaneously.

13 Claims, 4 Drawing Sheets

OTHER PUBLICATIONS

Sjorberg, Zipper: A Duplex Method for VDSL Based on DMT, 1999, IEEE, all pages.*

Sjoberg2, The Zipper Duplex Method in Very High Speed Digital Subscriber Lines, 2000, Lulfa Tenkiska Universitet, all pages.*

Nilson, Autonomous Synchronization of a DMT-VDSL System in Unbundled Networks, 2002, IEEE, all pages.*

Isson, Zipper Discrete Multi-Tone Echo-Canceller, 2000, Electronics Letters, vol. 26 No. 3.*

Isaksson, Zipper A Flexible Duplex Method for VDSL, 1997, Lulea University of Technology, all pages.*

Nilsson, Self Synchronizing a DMT-based VDSL System, 2001, IEEE, all pages.*

Sjiberg, Asynchronous Zipper, 1999, IEEE, all pages.*

Mestolagh, Zipper VDSL: A Solution for Robust Duplex Communication Over Telephone Lines, 2000, IEEE, all pages.*

Mestdagh, D G et al:, Zipper VDSL: a solution for robust duplex communication over telephone lines. In: Communications Magazine, IEEE, May 2000, pp. 90-96, vol. 38, issue 5, INSPEC AN: 6601305. See whole document.

Kimpe, M. et al., SHDSL Baseline Proposal, IEEE EFM Interim, Sep. 2002.

European Office Action in Corresponding Application No. 04 725 583.1-1237 Dated Apr. 6, 2010.

* cited by examiner

METHOD IN A TRANSCEIVER FOR ALLOCATING TRANSMISSION CAPACITY BETWEEN THE TWO DIRECTIONS OF TRANSMISSION IN WIRE LINE DATA COMMUNICATION

TECHNICAL FIELD OF THE INVENTION

The present invention relates to a method in a transceiver for allocating transmission capacity between the two directions of transmission in wire line data communication.

It also relates to a transceiver adapted to be positioned in communication sites of a wire line data communication system, said transceiver being adapted to transmit and receive data in the system and comprises a control unit adapted to control the functions of the transceiver.

BACKGROUND OF THE INVENTION

The Public Telephone Access Network

Figure 1:
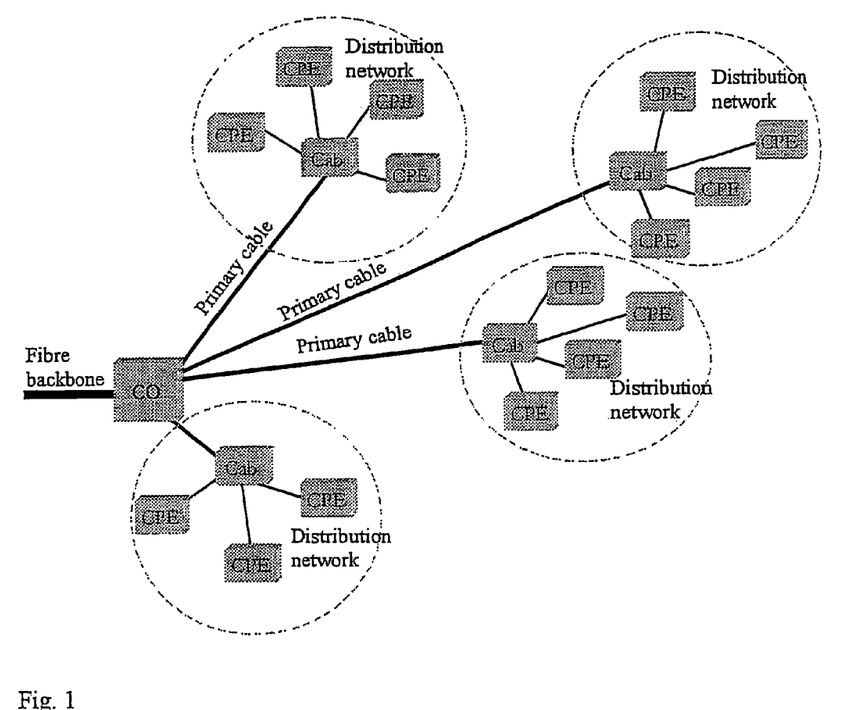
FIG. 1 shows an access network topology.

The access network (telephone network) constitutes a star-net-topology, see FIG. 1. The fibre backbone data network is terminated at the Central Office (CO) supporting 500-20000 end customers. From the CO primary cables carrying 100-1200 pairs runs to Cabinets (Cab) which are cross-connect-points. The last 100-800 meters of twisted pairs between the Cab and the customer premises is called the distribution network.

It is desirable to re-use the existing copper access network for delivering high capacity data connections ("broadband") to the premises. The family of systems designed for this purpose is called DSL (Digital Subscriber Lines) systems.

Statistics of network topology and cable lengths are crucial parameters when deploying DSL. The copper loops have the property that the possible transmission data rates decreases for longer loops because the signals get more attenuated the longer the loop is. A second property that limits the possible data rates is crosstalk, i.e. self made noise, that occurs between different copper pairs in the same cable during transmission.

Common to all currently used DSL systems is that they are designed for a worst case scenario. This means that the systems are designed for a maximum cross-talk scenario, i.e. all systems are transmitting all the time and generates full cross talk to each other. In reality, it is very unlikely that all users are transmitting and receiving data at the same time, and all the time, and thus it can be argued that this optimization criteria would lead to a waste of capacity. An outcome of this is that some users that would need more capacity cannot have it since the system is "saving" capacity in case the maximum cross-talk scenario should occur.

Figure 2:
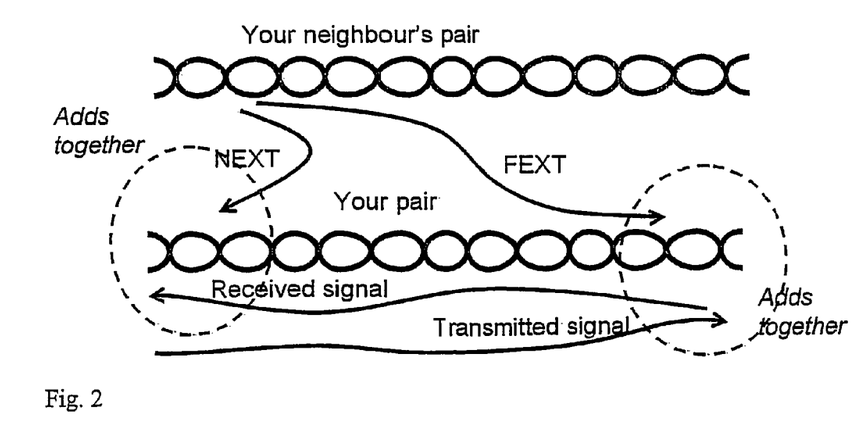
FIG. 2 shows how crosstalk arises.

There are two kinds of crosstalk: Near End Cross Talk (NEXT) and Far End Cross Talk (FEXT). NEXT is noise that comes from a transmitter on a neighbouring pair at the same end. FEXT is noise that comes from a transmitter on a neighbouring pair located at the far end of the line. This is illustrated in FIG. 2.

Figure 3:
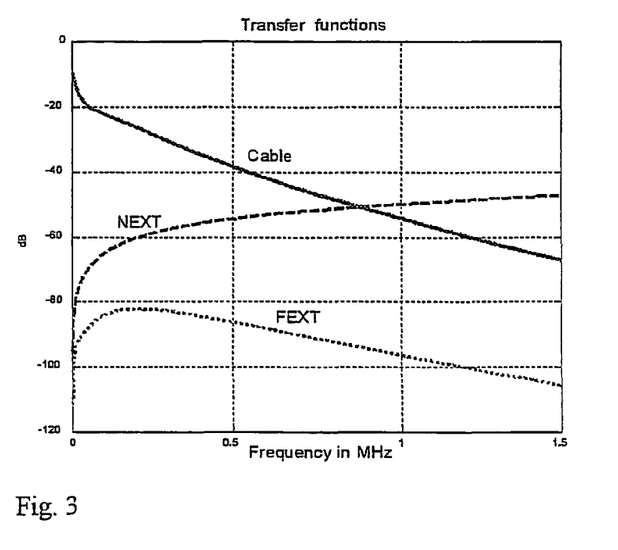
FIG. 3 is a spectral description of attenuation, NEXT and FEXT.
Figure 4:
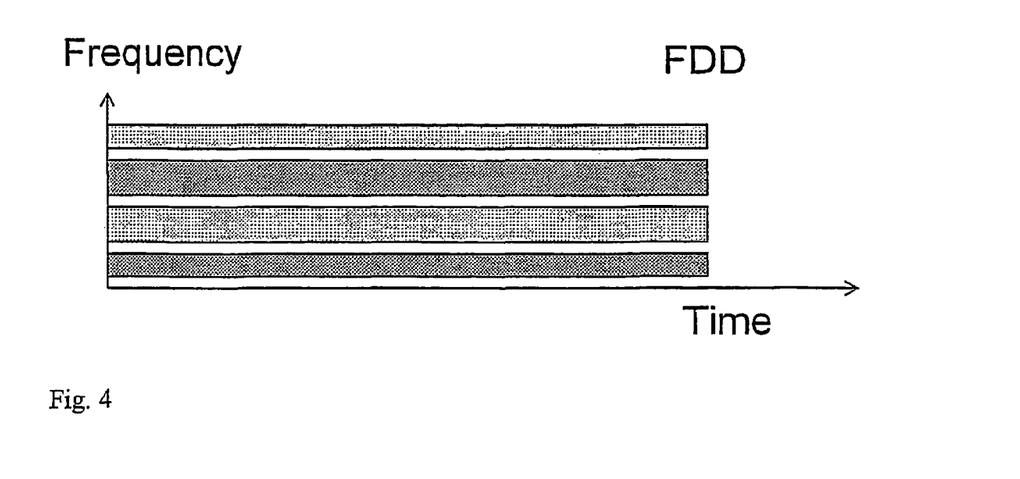
FIG. 4 is a diagram showing Frequency Division Duplex (FDD).
Figure 5:
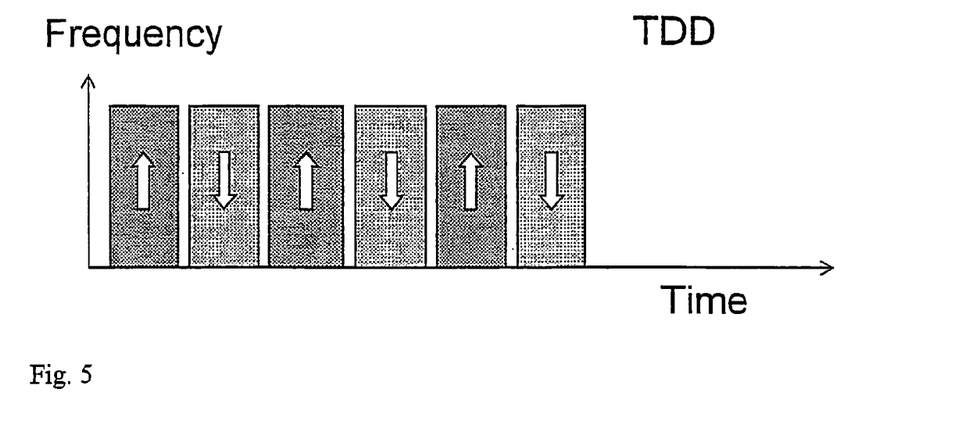
FIG. 5 is a diagram showing Time Division Duplex (TDD).
Figure 6:
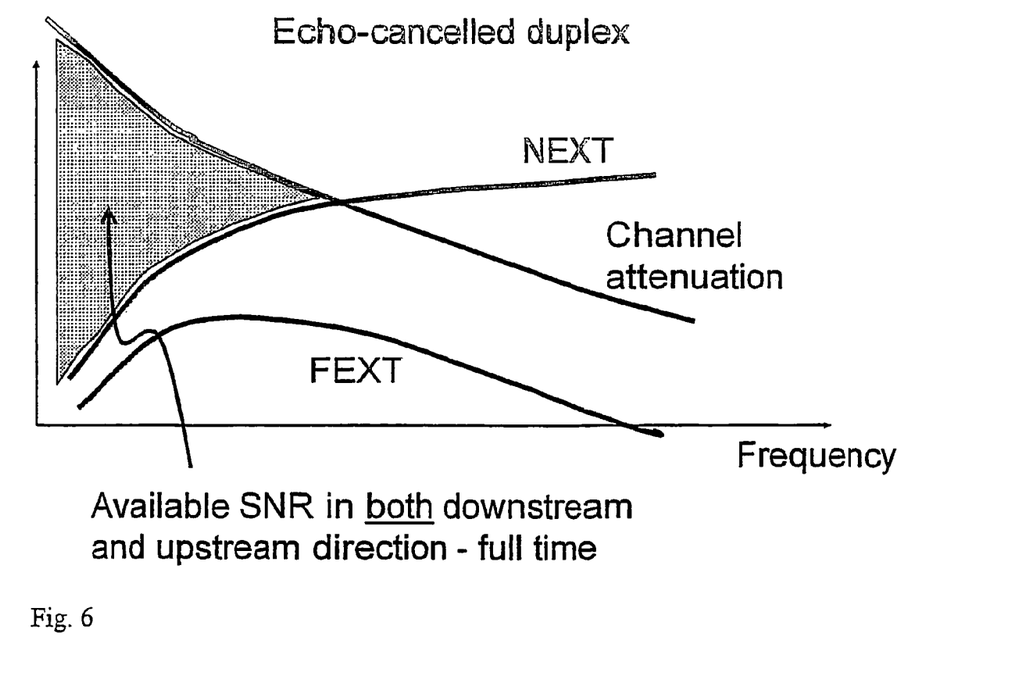
FIG. 6 is a diagram showing Echo Cancelled Duplex.

NEXT is always stronger than FEXT and most DSL systems are designed to avoid NEXT but assumes that FEXT always is present. Some systems operating at low frequencies, i.e. frequencies up to 500-800 kHz, are designed to also take NEXT into account. This is possible since NEXT is not very severe at low frequencies (see FIG. 3). At these frequencies the received signal is stronger than the NEXT, and hence there exist a positive signal to noise ratio that can be used for transmission in both directions.

Existing standardized DSL (digital subscriber lines) systems for high capacities (5-10 Mbit/s in both directions) suffers from short reach. VDSL, Very high speed Digital Subscriber Line, is a member in the DSL family that is designed for high capacities (10-52 Mbit/s). The reason why VDSL can offer much higher capacities than, e.g., ADSL, Asymmetric Digital Subscriber Line, and SHDSL, Symmetric High bit rate Digital Subscriber Line, is that the system uses a much larger bandwidth. The VDSL frequency band ranges from some 100 kHz up to 12-20 MHz. ADSL and SHDSL are using frequencies between 0 and maximum 1.1 MHz. Because of the attenuation that increases with frequency and cable length, and the crosstalk, the usable bandwidth decreases very fast for longer loops. This means that the large bandwidth of VDSL is only usable for shorter loops. VDSL can deliver 10 Mbit/s up to 800-1000 meters. For longer loops the attenuation in a VDSL system is too high and the data rates drops quickly down to, or below, the level of ADSL and SHDSL.

The DSL Family

There are several variants of DSL systems standardized in international standardization bodies such as ITU-T (International), T1E1 (North America), and ETSI (Europe). The three most significant systems are briefly presented in the sequel.

ADSL, Asymmetric Digital Subscriber Line

ADSL is the most popular and widely deployed DSL system. The cornerstone for ADSL systems is long reach capability and asymmetric data rates. Asymmetric data rates means that the system is designed for providing a higher data rate in the downstream direction than in the upstream direction. The ADSL network equipment is installed at the central office (local exchange) and operates over the existing copper infrastructure providing services to a majority of existing telephone customers (e.g., 80-90% in European networks). The operator only needs to increase broadband capacity in the backbone and pre-install equipment at the central office in a regional area. He will later connect new customers as they adopt to the service offered in that area. Only small adjustments in existing copper network are required. When using ADSL it is possible to support ordinary telephony (POTS—Plain Ordinary Telephone Service) carried over the same line.

SHDSL, Symmetric High Bit Rate Digital Subscriber Line

SHDSL is a system that is designed to provide symmetric data rates, in the magnitude of 2 Mbit/s in each direction, at long range. It is expected that SHDSL mainly will be used by business customers with the need of LAN interconnect, PABX's (private automatic branch exchange), Internet, etc. When using SHDSL it is not possible to support ordinary analogue telephony (POTS) carried over the same line.

VDSL, Very High Speed Digital Subscriber Line

VDSL is considered to be the next generation broadband technology for the copper networks. It provides higher data bandwidths than ADSL and SHDSL but to the expense of shorter reach. For VDSL, network operators can only partly use the same deployment strategy as for ADSL. From the central office, VDSL can be offered to e.g. 30-50% of customers compared to 80-90% in the case of ADSL. (This depends on the topology of the specific network.) To further increase the VDSL customer base it is necessary to deploy a fibre-to-the-cabinet (FTTCab) infrastructure meaning that the fibre termination point is moved closer to the premises giving a shorter copper loop. The cabinet is deployed at the local cross-connect point for the distribution network, which normally is the only point-of-presence for the cable. (The cabinet is in general the only point where practical operations on the cable are possible.) The VDSL Digital Subscriber Line Access Multiplexer (DSLAM) equipment will be placed in the new cabinet and VDSL is used to serve the customers over the last drops of cable. When using VDSL it is possible to support ordinary telephony carried over the same line.

Deploying new FTTCab infrastructures is a difficult decision since it is considered expensive by many network operators. Dedicated VDSL roll-out investments are done in advance of the market and may lead to uncertain pay-back times for the new cabinets that contain active electronics, broadband equipment, power feeding, and environmental protection. Still there are a number of operators that have plans to do it as a step towards a more modern and data centric access network.

Duplex Methods

The way the available analogue bandwidth is shared in both direction of transmission is described and managed by the use of a duplex method. There are in principle four different duplex methods:

Frequency Divided Duplex (FDD):

In a FDD system the available analogue bandwidth is divided into non-overlapping frequency bands. Each band is used for either up- or downstream transmission. In a FDD system NEXT is avoided, but FEXT will occur. Examples of DSL systems that are based on FDD are ADSL and VDSL.

Time Division Duplex (TDD):

In a TDD system the up- and down stream data is transmitted in different time slots, i.e., the entire analogue bandwidths is used for both up- and downstream transmission, but not at the same time. To avoid NEXT it is necessary that all modems in the same cable is time synchronized, i.e. all modems send upstream data at the same time, and downstream data at the same time. Synchronized TDD is used in Japan for ISDN and a special Japanese variant of ADSL.

Echo Cancelled Duplex (EC), sometimes also denoted as "full duplex":

Data is transmitted simultaneously in both up- and downstream direction over the same frequency band, i.e., the entire analogue bandwidth is used in both directions. With this technique the modem receiver will receive not only the signal transmitted from the other side of the line, but also its own return echo from the transmitter at the same side. This requires that the modem provides echo cancellation functionality. EC systems suffer from, and are limited by NEXT. SHDSL is a member in the DSL family that utilize EC techniques.

Burst Mode Duplex (BM)

See, for instance, the technology white paper: "Etherloop Spectrum Manager", Patric Stanley, Elastic Networks, doc. Nr. 08-01063-01. In BM each modem transmits and receives data in up- and downstream in a non synchronized fashion. The modem is silent when it does not have data to send. This means that received data either suffer from NEXT and/or FEXT from other pairs, or not suffers at all from crosstalk. There are no standardized systems based on this duplex method.

Problems With Current And Existing Techniques

ADSL provides asymmetric services at long loops, but is suboptimal when it comes to provide high bandwidth symmetric services at long loops.

VDSL provides high bit rates at short loops, but cannot be used for long loops.

SHDSL provides symmetric long reach services, but the capacity at short loops is much less than VDSL bit rates.

For VDSL systems a technique called Zipper is standardized. Zipper is a time-synchronized frequency division duplex implementation of discrete multi tone (DMT) modulation. The Zipper technique is described in WO 99/43123. A system using the Zipper technique suffers however from the same disadvantage as described for VDSL above, i.e. can not be used for long loops.

In EP 0991202 it is described how echo cancellation can be implemented in a system using Zipper. Here it is described that it is possible to utilize echo cancellation for all carriers in a Zipper system. However, such a system is not optimal for providing high capacities at short loops. Even if the echoes are cancelled for the entire transmission band, the NEXT will drown the high frequency signal and the overall capacity will be lower.

SUMMARY OF THE INVENTION

An object of the invention is to provide a wire line data communication system with long reach and high capacity for symmetrical services.

This object is achieved in a method according to claim 1 and in a transceiver according to claim 9.

Hereby a system and a method for wire line data communication are provided where the different advantages of the different duplex methods can be utilized simultaneously, thereby allowing for both long reach and high capacity.

Suitably the step of allocating comprises allocating a first frequency band comprising the lowest available frequency band to full duplex with echo cancellation and at least two frequency bands to FDD, said FDD bands following the first band in frequency, at least one of the FDD bands being used for upstream transmission and at least one for downstream transmission and allocating a frequency band for the highest of the available bandwidth to burst mode duplex.

Hereby both the possibility of full capacity for one user is provided by the burst mode band and at the same time a guaranteed capacity is always provided by the FDD bands if more users are transmitting at the same time.

Further advantageous embodiments of the invention are set out in the dependent claims.

DETAILED DESCRIPTION OF EMBODIMENTS

The present invention combines several duplex methods to obtain attractive properties. It makes it possible to provide a system that can offer high peak capacity for short cables and a guaranteed symmetric threshold capacity for both long and short cables.

Figure 7:
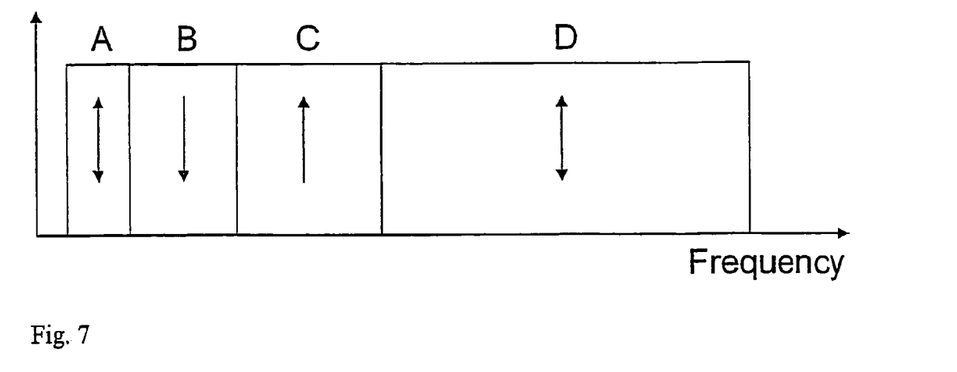
FIG. 7 is a diagram showing a first embodiment of a mixed duplex frequency plan according to the invention.

One embodiment of a mixed duplex frequency plan according to the invention is depicted in FIG. 7. This frequency plan example consists of four frequency bands; A, B, C and D. The intention with the mixed duplex band plan is to arrange the signalling, e.g. to use different duplex methods in different parts of the spectrum simultaneously, to obtain system properties that offers both long range symmetric services and high bit rates for shorter ranges.

Band A is located at low frequencies, e.g. 30-500 kHz. This is only a qualitative guess. The exact corner frequencies are determined by taking many different optimization criteria into account. The criteria could be for example network topology, the type of services, profitability, etc. The same applies for the exact positions in the available frequency band of the other bands in the mixed duplex plan. Band A is a full duplex band where echo cancellation is used. Since this band is located at low frequencies it can always be used for both long and short cables. Due to the cable attenuation this is the only usable frequency band for very long cables. A typical data rate for this band is 2.3 Mbps symmetric for reaches up to 1700-2500 meters, see for example Marc Kimpe's IEEE contribution on SHDSL.

Band B and C are FEXT limited bands using FDD as the duplex method. This means that in band B only downstream transmission is allowed and in band C only upstream transmission is allowed or vice verse. The corner frequencies of band B can be, for instance, 500 kHz to 2 MHz, and the corner frequencies for band C can be for example 2 MHz and 4 MHz. As discussed above the optimal position of these corner frequencies could depend on many different criteria.

Band D can be used as a full duplex band from for example 4 MHz up to for example 12 MHz. 12 MHz is the highest standardized frequency in VDSL. In another system it would be possible to use even higher frequencies. If D is used for full duplex, it is preferred that the transceiver uses it only when it has data to send and is silent the rest of the time, i.e. burst mode duplex. Hereby band D can only be fully utilized if the user is the only user transmitting at a specific moment. If however, other users are transmitting at the same time in band D they will introduce crosstalk to the signal and significantly decrease the data rate capacity of that band. Therefore, the FDD bands, in this example band B and C, are used to provide a minimum guaranteed capacity to all the users. With this system all users are always given at least the guaranteed capacity, in the FDD bands. Furthermore, in many cases the users are provided the whole capacity of band D. In addition also long range services are provided good capacity through the first band, which is band A in this example. Furthermore it would be possible to use echo cancellation in band D also to increase the data rate in both directions for a single user when no other user is transmitting. In one embodiment, band D is only used as an extra resource. In this embodiment band A, B and C are normally used and band D is used when more capacity is needed.

Of course the number of bands can be varied. The arrangement of the bands and the positions of the bands can also be varied in frequency. The given example is just one of many possible examples. For example there could be more FDD bands and they could be distributed between up- and downstream transmission as desired. Band D can be omitted or used as a pure FDD band.

Figure 8:
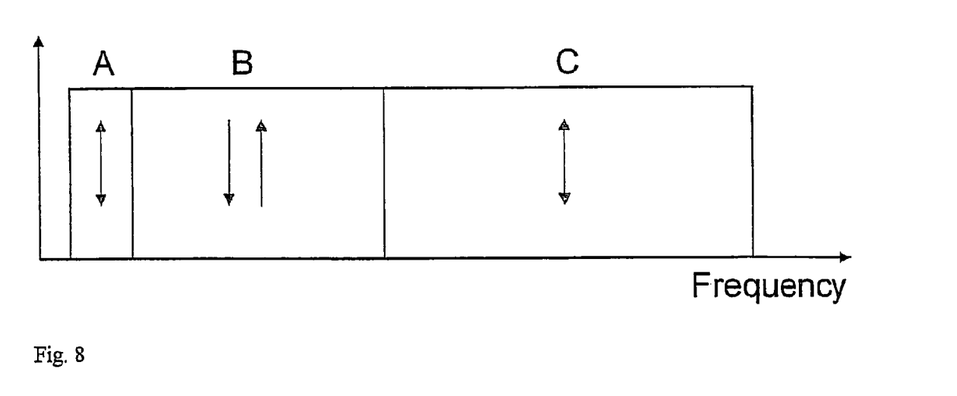
FIG. 8 is a diagram showing a second embodiment of a mixed duplex frequency plan according to the invention.

A second embodiment of a mixed duplex frequency plan according to the invention is depicted in FIG. 8. Here the entire frequency band is sub-divided into three bands, A, B, and C. As in the previous example, band A is used for echo cancelled duplex. The difference is that band B is used for time division duplex. Band C corresponds to band D in the previous example and is used for burst mode duplex. By using TDD in band B, the same characteristics is obtained as in the previous example where B and C were used for FDD; this band will guarantee that a certain capacity always will be preserved.

Suitably, a single transceiver is able to perform the management and allocation of the different duplex methods to different frequency bands, see further below.

In one preferred embodiment of the invention the system is based on the Zipper Discrete Multi-tone Modulation (DMT) technique, i.e. the available bandwidth is divided by assigning different sub carriers for the different directions. The Zipper technique allows the bandwidth to be split dynamically between up- and downstream in almost any proportion without requiring a complex bank of tunable pass band analog filters. Thus almost any desired ratio between up- and downstream bit rates can be chosen at any time. An advantage with the Zipper technique for this invention is that the frequency location, i.e. the bandwidth and frequency edges, of the bands and the arrangement and number of different bands can easily be adjusted at any time via the use of control software. Furthermore, with the Zipper DMT technique echo cancellation is simple and effective as is described in EP 0991202.

The invention will now be described more generally. For long loops, where the attenuation is high, the only usable spectrum is the lowest part of the frequency spectrum. This is band A in the first embodiment. For delivering symmetric data services for customers with long loops the best way to utilize this spectrum is to apply the duplex method based on echo cancellation, i.e., use the same band for continuous transmission in both directions. Thus, according to the invention a first band using full duplex and echo cancellation is provided for low frequencies. Preferably the Zipper technique is used as described above.

To be able to offer high data rates to customers with shorter loops, the frequency bands higher up in the spectrum should use FDD or TDD in order to avoid NEXT. This is band B and C in FIG. 7 in the first embodiment but it could also be more than two different bands using FDD. These FDD or TDD bands guarantees a certain band width even if other users are transferring at the same time.

It is also possible according to the invention to provide full duplex bands higher up in the spectrum giving the possibility of extra capacity to users. In the embodiment described in relation to FIG. 7 this is band D. In band D echo cancellation can also be used allowing for a user to send data simultaneously in both directions. In this case due to the strong NEXT it would be preferred to only transmit when no other modem is transmitting. It assumes that a modem is silent when it doesn't transmit. This is also called "burst mode transmission".

In a system according to the invention data with high QoS (Quality of Service) requirement, could be prioritised to be transported over bands providing guaranteed bandwidth.

A wire line data communication system comprises a transceiver, often called a modem, in each end of line. The modems transmit and receive signals and translate the signals from analogue to digital representation and vice verse. The function of a modem in a wire line data communication system is well known for a person skilled in the art and will not be described in detail here.

Figure 9:
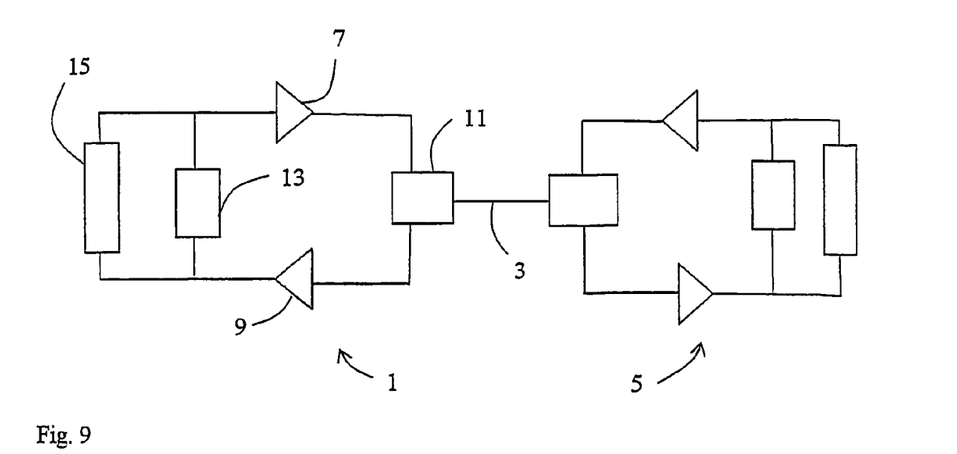
FIG. 9 is a diagram schematically showing a transceiver according to the invention.

Such a transceiver is schematically shown in FIG. 9. In the figure a first transceiver 1 is connected to a telephone line 3 which in turn is connected to a second transceiver 5. The first and second transceivers comprise the same parts and the same functions. Here below the first transceiver 1 is described in detail and is shown to comprise a digital and analogue transmitter 7 and a digital and analogue receiver 9 both connected to a hybrid 11. The hybrid 11 is connected to the telephone line 3. The transmitter 7 is adapted to transmit the signals out to the telephone line 3 through the hybrid 11 and the receiver 9 is adapted to receive signals from the telephone line 3 through the hybrid 11. Furthermore, the transceiver comprises an echo canceller 13 which is connected to both the transmitter 7 and the receiver 9. The echo canceller is adapted to cancel echo received in the receiver 9 originating from the signal transmitted from the transmitter 7. The signal transmitted from the transmitter 7 can be reflected in the hybrid 11 and in impedance miss-matches along the telephone line 3. These echo signals will disturb the actual received signal. How the echo canceller is working is described in for example EP 0991202 and will not be further described here.

Furthermore, a control unit 15 is provided in the transceiver. This control unit 15 is connected to the echo canceller 13 and to the transmitter 7 and the receiver 9 and is adapted to control these units. According to the invention the control unit 15 comprises echo canceller controlling means adapted to control the echo canceller 13 to only echo cancel in certain frequency bands. In the first embodiment the signals received in frequency band A should be echo cancelled and possibly also the signals in frequency band D. The control unit 15 comprises software defining the requested band arrangement, i.e. which frequency bands that should be allocated to which duplex methods. As already discussed above, the low frequency bands should preferably be allocated for full duplex with echo cancellation and at least two frequency bands higher in the spectrum should be allocated for FDD or possibly one band for TDD. The control unit 15 controls the echo canceller 13, the transmitter 7 and the receiver 9 to allocate the frequencies accordingly.

The transceiver with the control unit, echo canceller unit, and the other units is preferably located on a chip that is easily mounted into a modem.

A public telephone network has been described. It should however be clear that the invention could be applied also in private networks, such as Multi-Dwelling Unit (MDU) networks, Multi-Tenant Unit (MTU) networks, and campus area networks.

The method according to the invention is implemented by means of a computer program product comprising the software code means for performing the steps of the method. The computer program product is run on a computer placed in the transceiver. The computer program is loaded directly or from a computer usable medium, such as a floppy disc, a CD, the Internet etc.

The invention claimed is:

1. A method performed in one single transceiver for allocating transmission capacity between the two directions of transmission in wire line data communication, comprising:
   the step of allocating from said single transceiver different parts of the available bandwidth of one line to different duplex methods simultaneously,
   wherein the step of allocating comprises allocating at least two frequency bands to FDD, said FDD bands following a first band in frequency, which is used for full duplex with echo cancellation, at least one of the FDD bands being used for upstream transmission and at least one for downstream transmission.

2. The method according to claim 1, further comprising using the Zipper technique for the data transmission.

3. The method according to claim 1, wherein the step of allocating comprises allocating a first frequency band comprising the lowest available frequency band to full duplex with echo cancellation.

4. The method according to claim 1, wherein the step of allocating comprises allocating a frequency band for the highest of the available bandwidth to burst mode duplex.

5. The method according to claim 1, wherein the step of allocating comprises allocating a frequency band of the available bandwidth to TDD.

6. A non transitory computer readable recording medium with a computer program recorded thereon directly loadable into the internal memory of a processing means within a computer placed in a transceiver, comprising the software code means for performing the steps of claim 1.

7. A non transitory computer readable storage medium with a computer program recorded thereon, executed by a processing means in a computer placed in a transceiver, to control an execution of the steps of claim 1.

8. A transceiver adapted to be positioned in communication sites of a wire line data communication system, said transceiver being adapted to transmit and receive data in the system and comprises a control unit (15) adapted to control the functions of the transceiver, comprising:
   said control unit (15) is adapted to control the transceiver to allocate different parts of the available frequency bandwidth of one line to different duplex methods simultaneously,
   wherein the control unit (15) is adapted to control the transceiver to allocate at least two frequency bands to FDD, said FDD bands following a first band in frequency, which first band is used for full duplex with echo cancellation, at least one of the FDD bands being used for upstream transmission and at least one for downstream transmission.

9. The transceiver according to claim 8, wherein the control unit (15) is adapted to control an echo canceller (13) in the transceiver to only echo cancel signals received in the transceiver in certain predefined frequency bands.

10. The transceiver according to claim 8, further comprising a means for using the Zipper technique for the data transmission.

11. The transceiver according to claim 8, wherein the control unit (15) is adapted to control the transceiver to allocate a first frequency band comprising the lowest available frequency band to full duplex with echo cancellation.

12. The transceiver according to claim 8, wherein the control unit (15) is adapted to control the transceiver to allocate a frequency band for the highest of the available bandwidth to full duplex in burst mode.

13. The transceiver according to claim 8, wherein the control unit (15) is adapted to control the transceiver to allocate a frequency band of the available bandwidth to TDD.

* * * * *

UNITED STATES PATENT AND TRADEMARK OFFICE
CERTIFICATE OF CORRECTION

PATENT NO.         : 7,817,671 B2
APPLICATION NO.    : 10/551769
DATED              : October 19, 2010
INVENTOR(S)        : Isaksson It is certified that error appears in the above-identified patent and that said Letters Patent is hereby corrected as shown below:

On Page 2, in Field (56), under "OTHER PUBLICATIONS", in Column 1, Line 1, delete "Sjorberg," and insert -- Sjoberg, --, therefor.

On Page 2, in Field (56), under "OTHER PUBLICATIONS", in Column 1, Line 5, delete "Nilson," and insert -- Nilsson, --, therefor.

On Page 2, in Field (56), under "OTHER PUBLICATIONS", in Column 2, Line 1, delete "Sjirberg," and insert -- Sjoberg, --, therefor.

On Page 2, in Field (56), under "OTHER PUBLICATIONS", in Column 2, Line 5, delete "lines. In:" and insert -- lines in --, therefor.

In Column 3, Line 13, delete "modem" and insert -- modern --, therefor.

Signed and Sealed this
Twenty-third Day of August, 2011

David J. Kappos
*Director of the United States Patent and Trademark Office*